(12) United States Patent
Berger et al.

(10) Patent No.: US 7,520,111 B2
(45) Date of Patent: Apr. 21, 2009

(54) STONE DETECTION METHOD AND APPARATUS FOR A HARVESTER

(75) Inventors: John G. Berger, Landisville, PA (US); David N. Heinsey, Stevens, PA (US); John B. Crego, New Holland, PA (US)

(73) Assignee: CNH America LLC, New Holland, PA (US)

( * ) Notice: Subject to any disclaimer, the term of this patent is extended or adjusted under 35 U.S.C. 154(b) by 644 days.

(21) Appl. No.: 11/361,908

(22) Filed: Feb. 24, 2006

(65) Prior Publication Data

US 2006/0277882 A1 Dec. 14, 2006

Related U.S. Application Data (60) Provisional application No. 60/689,926, filed on Jun. 13, 2005, provisional application No. 60/689,250, filed on Jun. 10, 2005.

(51) Int. Cl.
A01D 75/28 (2006.01)
(52) U.S. Cl. .................................................. 56/10.2 J
(58) Field of Classification Search .................. 56/1, 56/10.2 R, 10.2 J, 16.4 R, 16.5, 16.4 A; 460/1, 460/2, 3; 701/50
See application file for complete search history.

(56) References Cited

U.S. PATENT DOCUMENTS

| | | | |
|---|---|---|---|
| 3,805,798 A | 4/1974 | Girodat | 130/27 R |
| 4,004,289 A | 1/1977 | Kirk | 340/267 R |
| 4,212,398 A | 7/1980 | Parker et al. | 209/590 |
| 4,294,062 A * | 10/1981 | Seymour | 460/2 |
| 4,296,409 A | 10/1981 | Whitaker et al. | 340/684 |
| 4,335,564 A | 6/1982 | Knepper | 56/10.2 |
| 4,353,199 A * | 10/1982 | Chow et al. | 460/2 |
| 4,666,046 A * | 5/1987 | Manzer | 209/599 |
| 5,082,118 A | 1/1992 | Rintala et al. | 209/599 |
| 5,092,818 A | 3/1992 | Bohman et al. | 460/2 |
| 5,374,521 A | 12/1994 | Kipling et al. | 435/6 |
| 5,477,506 A | 12/1995 | Allen | 367/140 |
| 5,600,942 A | 2/1997 | Strosser | 56/10.25 |

(Continued)

OTHER PUBLICATIONS

Robinson, et al. U.S. Appl. No. 2005/0011266 A1, dated Jan. 20, 2005.

*Primary Examiner*—Robert E Pezzuto
(74) *Attorney, Agent, or Firm*—Michael G. Harms; John William Stader; Patrick M. Sheldrake (57) ABSTRACT

A hard object or stone detection method and apparatus for detecting and removing discrete hard foreign objects from mobile agricultural equipment, particularly an agricultural harvester including apparatus for providing a flow of cut crop material to an elevator for delivery to a threshing system. The apparatus includes a foreign object detecting mechanism, including a foreign object detecting circuit for detecting foreign objects and an object exclusion or rejection mechanism operationally connected to be activated by the detecting circuit. The detecting circuit includes at least one vibration sensor operable for outputting a signal, and a combination of high pass filters and frequency bandpass filters and variable threshold comparators for processing the signal along first and second signal paths, and at least one microprocessor or microcontroller including a pulse rejection network. The microprocessor can be electronically connected to control the threshold comparators and programmable amplifiers, and activates the object exclusion or rejection mechanism when the pulse rejection network generates an internal signal indicating presence of a hard object.

26 Claims, 6 Drawing Sheets

U.S. PATENT DOCUMENTS

| | | | |
|---|---|---|---|
| 5,901,534 A | 5/1999 | Weiss et al. | 56/10.2 J |
| 6,044,632 A * | 4/2000 | Schmalz et al. | 56/10.2 R |
| 6,430,903 B1 | 8/2002 | Christiansen et al. | 56/10.2 J |
| 6,601,372 B1 * | 8/2003 | Heinsey et al. | 56/10.2 J |
| 6,863,604 B2 | 3/2005 | Behnke | 460/6 |

* cited by examiner

STONE DETECTION METHOD AND APPARATUS FOR A HARVESTER

This application claims the benefit of U.S. Provisional Application No. 60/689,926, filed Jun. 13, 2005, and U.S. Provisional Application No. 60/689,250, filed Jun. 10, 2005.

FIELD OF THE INVENTION

The present invention pertains to a stone detection method and apparatus for detecting and removing discrete hard foreign objects from mobile agricultural equipment. Specifically, self-propelled combine harvesters and forage harvesters are adapted with an apparatus that performs the method of detection of rocks and other discrete hard objects to permit the reliable removal of the rocks and hard objects from harvested crop material during crop harvesting operations.

BACKGROUND OF THE INVENTION

In the art of mechanically harvesting crops, it is known that self-propelled agricultural vehicles, such as combine harvesters and forage harvesters, are used to mechanically harvest crops. Typically, these vehicles are equipped with a harvesting implement, or header, that can, for instance, include a reel or other apparatus for pulling crops into an array of blades for cutting the crops, wherein the cut crop material is pulled or otherwise conveyed farther into the header by an auger or other apparatus. Once past the auger, the cut crop material is carried by an elevator or feederhouse to a threshing and sorting mechanism or system that removes unwanted chaff material from the desired crop matter before the crop matter reaches a storage compartment or tank carried by the vehicle.

However, this simple crop harvesting process is complicated by the fact that stones and other discrete hard objects are often pulled into the header with the crops. In the context of this disclosure, the terms "stones," "rocks," "objects," and "hard materials" are used interchangeably and define equivalent matter to include any discrete undesirable matter such as stones, rocks, pieces of metal, and pieces of wood, that is separable from the cut crop material (i.e., harvested crop plant material) and thus considered to be foreign to the crops. Unfortunately, stones and other hard debris can cause expensive damage to the elevator and threshing mechanisms; therefore, various methods and apparatuses have been developed to detect and remove stones and other potentially damaging foreign objects from the header before the cut crop material is carried by the elevator into the threshing and sorting mechanism.

Typically, the stone detection methods and apparatuses of the prior art include a stone detection circuit that operates a mechanism for removing any stones or hard objects. For example, U.S. Pat. No. 3,675,660 to Girodat, which is incorporated herein by reference in its entirety, discloses a rock detection circuit that includes a rock detector, a bandpass filter, a peak signal detector, an amplifier, and a solenoid operated trap door placed along the cut crop path before the crop elevator. The rock detector is a piezoelectric ceramic disc that picks up vibrations as the crop material passes and sends a sensing signal to the bandpass filter. Rocks of a certain size are known to generate higher frequency vibrations than the crop material, so the bandpass filter removes low frequency signals from the sensing signal before sending the filtered signal to the peak signal detector.

Extremely large stones entering the combine feeder housing sometimes are not detected by the system of the Girodat patent. Several mechanisms are responsible for this. First, the physical size of a very large stone and the feeder front roll configuration prevents the required direct impact of the stone on the existing flat sensor plate. Instead, the stone is pinched between the front roll and the sensor plate which results in the stone being scraped and dragged across the plate. Second, when a very large stone does impact the sensor plate, acoustical signatures below about 2 kHz are generated—well below the ASP (Advanced Stone Protection) electronic box bandpass filter center frequency of 5 kHz. Only a small amount of signal is generated within the pass band of the filter. Thus, a very large stone is often not sensed and is thrust into the combine resulting in damage.

Thus, the peak signal detector generates a signal only if the filtered signal has an amplitude greater than a predetermined amplitude ("threshold amplitude"), thereby filtering out background noise signals. When the filtered signal exceeds the predetermined amplitude, the peak signal detector generates a signal that is amplified by an amplifier, which sends an activating signal to a solenoid, which operates to open the trap door so that the hard foreign object will fall out of the header. Unfortunately, there is a lot of background noise due to vibrations generated by the vehicle's engine, jarring of the vehicle as it travels along the ground, and rock impacts on the exterior of the header during harvesting operations.

Consequently, unless sensitivity of the rock detection circuit is precisely set, either the trap door will open unnecessarily thereby spilling valuable crop on the ground or the trap door will not open when needed so that many large stones will reach the elevator and threshing mechanism resulting in damage to the vehicle. It is noted that Girodat's rock detection circuit has no control components for adjusting the frequency sensitivity of the bandpass filter, or the threshold amplitude of the peak signal detector.

In an attempt to mitigate the effect of background vibrations, U.S. Pat. No. 4,275,546 to Bohman et al. discloses a stone discriminator circuit that uses a pair of piezoelectric crystals that are vibrationally isolated from the header and the harvester by two vibration isolators. The two piezoelectric crystals are set to detect different vibration frequencies, one crystal detects vibration generated by the crop material and the other crystal detects vibration generated by stones. Each crystal sends signals to its respective bandpass filter, then to a difference amplifier that receives input from both bandpass filters. The difference amplifier detects the difference between the signals from the two crystals and outputs an amplified signal to a threshold circuit.

The threshold circuit generates a signal to operate a trap door or an alarm only if the amplified signal from the difference signal exceeds a threshold amplitude. In other words, the two crystals provide comparative information with respect to the background vibrations and superimposed rock vibrations in an attempt to weed out the background events from stone impact events near the crystals. However, Bohman's circuit also has the drawback that the stone discriminator circuit has no control components for adjusting the frequency sensitivity of the bandpass filters, or the threshold amplitude of the threshold circuit.

U.S. Pat. No. 4,720,962 to Klinner discloses a means for detecting stones and metal, which is a circuit including a vibration detector and a metal detector for detecting unwanted objects in a forage harvester. The vibration detecting portion of the circuit includes a vibration sensor, a high pass filter and a comparator, so that a vibration detecting signal is generated that is frequency filtered and that represents an event exceeding a minimum threshold amplitude. Input from a metal sensor and input from the vibration detecting portion feed into the remaining portion of the stone and metal detection circuit to activate a door system to get rid of the unwanted object. It is noted that the stone and metal detection circuit includes a timing circuit so that the door system stays open for only a predetermined period of time. However, Klinner's stone and metal detection circuit has no control components for adjusting the frequency sensitivity of the bandpass filters, or the threshold amplitude of the threshold circuit.

Some other known stone detection or protection systems include two sensor plates and related two electronic bandpass filters in the stone detection or protection module employed to process signals from each plate in order to produce stone trap door openings whenever a stone impacts one of the plates. Each of these two filters passes a range of frequencies centered about a certain frequency. For the upper plate the center frequency is 3.1 kHz and for the lower plate the center frequency is 5 kHz.

Controlled tests strongly suggest that the upper sensor plate is relatively ineffective in contributing to stone detection or protection. Lab testing has conclusively shown that very large stones generate impact signals in the lower frequency region below about 2 kHz. Only a small amount of signal from the very large stones is available in the 5 kHz filter pass band. Medium to small stones generate impact signals mainly in the region above 2 kHz.

It has also been discovered that high force impacts of the largest stones (or even hard ear corn) produces a very large low spectrum electrical signal that can sometimes overload the electronic circuitry of the 5 kHz filter in the ASP module. Whenever an overload occurs, the amount of signal available in the 5 kHz region is reduced. This will adversely affect detection performance.

Therefore, the present invention endeavors to provide an improved method for detecting and removing hard objects from cut crop material during crop harvesting with a mechanical harvester, and an apparatus for performing this method that reliably produces cut crop material that is essentially solely cut crop matter that is an improvement over the prior art devices and methods.

Accordingly, a primary object of the present invention is to overcome the disadvantages of the prior art methods and apparatuses for detecting and removing hard objects from cut crop material during crop harvesting with a mechanical harvester.

Another object of the present invention is to provide a method and apparatus for detecting and removing hard foreign objects from cut crop material that achieves adequate detection rates for the hard foreign objects, so that the objects can be reliably removed.

Another object of the present invention is to provide a method and apparatus for detecting and removing hard foreign objects from cut crop material that allows for external adjustment of various detection parameters by an operator to achieve the improved detection rates for the hard foreign objects.

Another object of the present invention is to provide a method and apparatus for detecting and removing hard foreign objects from cut crop material that allows for the system to internally adjust to various internal and/or external influences that are transparent to the operator to achieve the improved detection rates for the hard foreign objects.

SUMMARY OF THE INVENTION

Accordingly, the present invention is proposed to overcome one or more of the problems, disadvantages, and shortcomings of the prior art, and achieve one or more of the objects, as set forth above.

According to a preferred aspect of the invention, as a modification of a known ASP system such as those discussed above including two sensor plates and bandpass filters, first, the known upper sensor system will be deleted or completely removed and the electronic filter in the stone protection module formerly used to process upper plate signals will be modified to process those signals from the lower plate caused primarily by very large stones. In order to accomplish this, the center frequency of the upper filter is changed from 3.1 kHz to 1 kHz—the region where large stones have been found to generate the most signal. This change means that signals generated by very large stones will generally be detected by the upper sensor bar filter and will more likely result in a stone trap door opening.

Second, to prevent 5 kHz filter overload, a high pass filter will be inserted in the signal path prior to the 5 KHz filter that will suppress signals below about 2 KHz. In addition to overload prevention, this modification will suppress unwanted low frequency ear corn impact signatures which can masquerade as large stones. Because of this modification, small to medium size stones will more likely be detected by the lower filter and be ignored by the upper filter. A sliding sensitivity scale is implemented in software so that in light grain crops both upper and lower filters can contribute to stone detection. When harvesting ear corn, the scale is adjusted downward by the operator so that much less of the upper filter is used in the detection process.

It is contemplated that the following advantages will result: (1) minimal impact on crop flow; (2) same user interface (0-100 percent gain in 10 percent increments); and (3) marked improved stone protection performance for very large stones, and incremental improvement performance for smaller stones.

In accordance with another preferred aspect of the present invention, there is provided a method for detecting and removing hard objects from a cut crop material that is not limited to any one particular apparatus, or combination of apparatuses, for performing the method. The method comprises the steps of providing a cut crop material that includes foreign hard objects in addition to cut crop matter; sensing the cut crop material and foreign hard objects using a sensor to generate a signal; amplifying the signal, wherein the magnitude of amplification is controlled by the microprocessor; processing the signal to filter a bandwidth to generate a bandwidth filtered signal, optionally wherein a microprocessor controls the frequency range of the filtered bandwidths; processing the bandwidth filtered signal to generate an amplitude threshold signal when the bandwidth filtered signal exceeds a minimum threshold amplitude, wherein the microprocessor controls a value of the minimum threshold amplitude; processing the amplitude threshold signal to generate an internal signal only when the amplitude threshold signal has a pulse width that exceeds a minimum pulse width value, thereby eliminating noise signals; and determining that a hard object is present based upon the internal signal, then removing the hard object based upon an output signal by using a hard object removal mechanism to produce a cut crop material that is essentially cut crop matter.

According to another preferred aspect of the present invention, an agricultural harvester is provided having a header. The header can be of conventional construction, for instance, a grain header with a reel and an auger or draper belt, wherein the reel and the auger or draper provide crop material to an elevator, or a corn head including an auger or draper to provide crop to an elevator, and including a foreign object detecting mechanism, wherein the foreign object detecting mechanism includes a foreign object detecting circuit to detect foreign objects and an object extrusion or removal mechanism operationally connected to be activated by the detecting circuit, wherein the detecting circuit is connected to a power supply and comprises a first vibration sensor that generates a first input signal in response to vibrations generated by a foreign object; a frequency high pass filter that removes low frequencies from the first input signal and produces a first high pass filtered input signal; a first programmable amplifier that receives the first high pass filtered input signal from the frequency high pass filter and generates an amplified first output signal; a frequency bandpass filter that receives and filters a bandwidth of the amplified first output signal to generate a first frequency filtered signal; a first variable threshold comparator that receives the first frequency filtered signal and generates a first pulse output signal when the first frequency filtered signal exceeds a minimum threshold amplitude; a first pulse rejection network that receives the first pulse output signal and generates an internal signal when a frequency calculated from the pulse train of the first pulse output signal corresponds to a specified frequency bandwidth; and a microprocessor that includes the pulse rejection network and that is electronically connected to the first threshold comparator and to the first programmable amplifier, wherein the microprocessor operates to control the value of the minimum threshold amplitude of the first threshold comparator and to control the magnitude of signal amplification performed by the first programmable amplifier, wherein the detecting circuit activates the object exclusion or removal mechanism whenever the detecting circuit generates a third output signal.

Furthermore, according to the preferred aspect, the present invention includes a second programmable amplifier, which receives the first input signal and produces a second amplified input signal; a low frequency band pass filter, which receives the second amplified input signal and produces a second frequency filtered signal; a second variable threshold comparator that receives the second frequency filtered signal and generates a second pulse output signal when the second frequency filtered signal exceeds a minimum threshold amplitude; a second pulse rejection network that receives the second pulse output signal and generates an internal signal when a frequency calculated from the pulse train of the second pulse output signal corresponds to a specified frequency bandwidth; and a microprocessor that includes the pulse rejection network and that is electronically connected to the second threshold comparator and to the second programmable amplifier, wherein the microprocessor operates to control the value of the minimum threshold amplitude of the second threshold comparator and to control the magnitude of signal amplification performed by the second programmable amplifier, wherein the detecting circuit activates the object exclusion or removal mechanism whenever the detecting circuit generates a third output signal.

Further objects, features and advantages of the invention will become apparent from the Detailed Description of Preferred Embodiments that follows, when considered together with the attached drawings.

DETAILED DESCRIPTION OF THE PREFERRED EMBODIMENTS

The present invention generally includes a method and apparatus for detecting and removing hard objects from a flow of cut crop material, and a representative agricultural harvester with which the invention can be used. To facilitate an easy understanding of the present invention, the agricultural harvester will be described first, with reference to the Figures.

Figure 1:
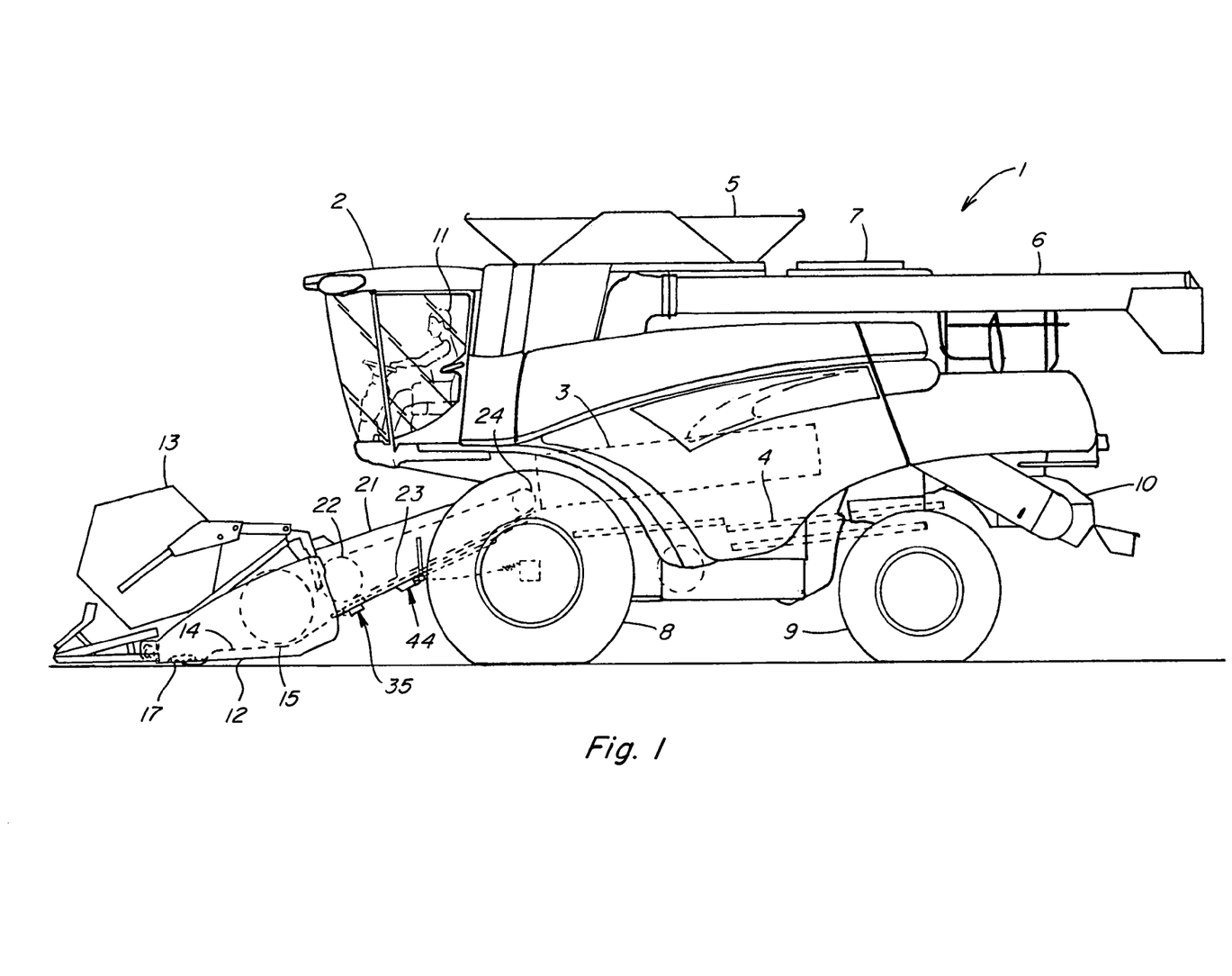
FIG. 1 is a side view of an agricultural harvester in accordance with preferred embodiments of the present invention.

Referring to FIG. 1, an agricultural harvester 1 is typically a self-propelled vehicle having two wheel pairs 8 and 9, engine 7 mechanically connected to rotate the wheels, cab 2 where the vehicle operator 11 sits, and a header 12 for harvesting crops. Header 12 includes reel assembly 13 for pulling crops into the header so that the crops are cut by blade assembly 17 in the conventional manner, and an auger 15 situated in an auger trough 14 for pushing cut crop material into the center of the header. As is conventionally known, the header 12 and the reel assembly 13 have position adjusting mechanisms (not shown) for moving and positioning the header and the reel assembly relative to the crops and the ground so that crops can be optimally harvested.

A cut crop elevator 21, or "feederhouse," is located at the center of the header 12 and is fed by the rotation of auger 15. Cut crop material moves from auger 15 to elevator 21 where the cut crop material is carried along a flow path through the bottom of the feederhouse along a floor thereof by an elevator apron 23 from a front drum 22 to a rear drum 24 and into the forward portions of the harvester 1. Essentially, elevator apron 23 includes at least two continuous chains which encircle drums 22 and 24 and include slats or bars which extend parallel to the drums and engage and convey or drag or push the crop material along the floor or bottom of the feederhouse as driven by rotation of the drums. Harvester 1 includes a threshing mechanism 3 which receives the flow of crop material fed into it by elevator 21 and which threshes the grain of the crop material from straw, cobs, pods, stems, and the like. The grain is then delivered to a grain/chaff separation system 4 which removes the chaff and other material other than grain from the grain. Once the grain or other crop has been threshed and the chaff removed, the product crop is conveyed to and stored in tank 5. Tube 6 is used to unload the product crop and any chaff is discarded by the chaff spreader 10.

To protect the elevator 21, threshing mechanism 3, and other systems of the harvester 1 from damage due to stones, rocks, metal pieces, and any other discrete foreign hard objects that are mixed in with the crop matter, the elevator 21 is fitted with a hard object detector 35.

Figure 4:
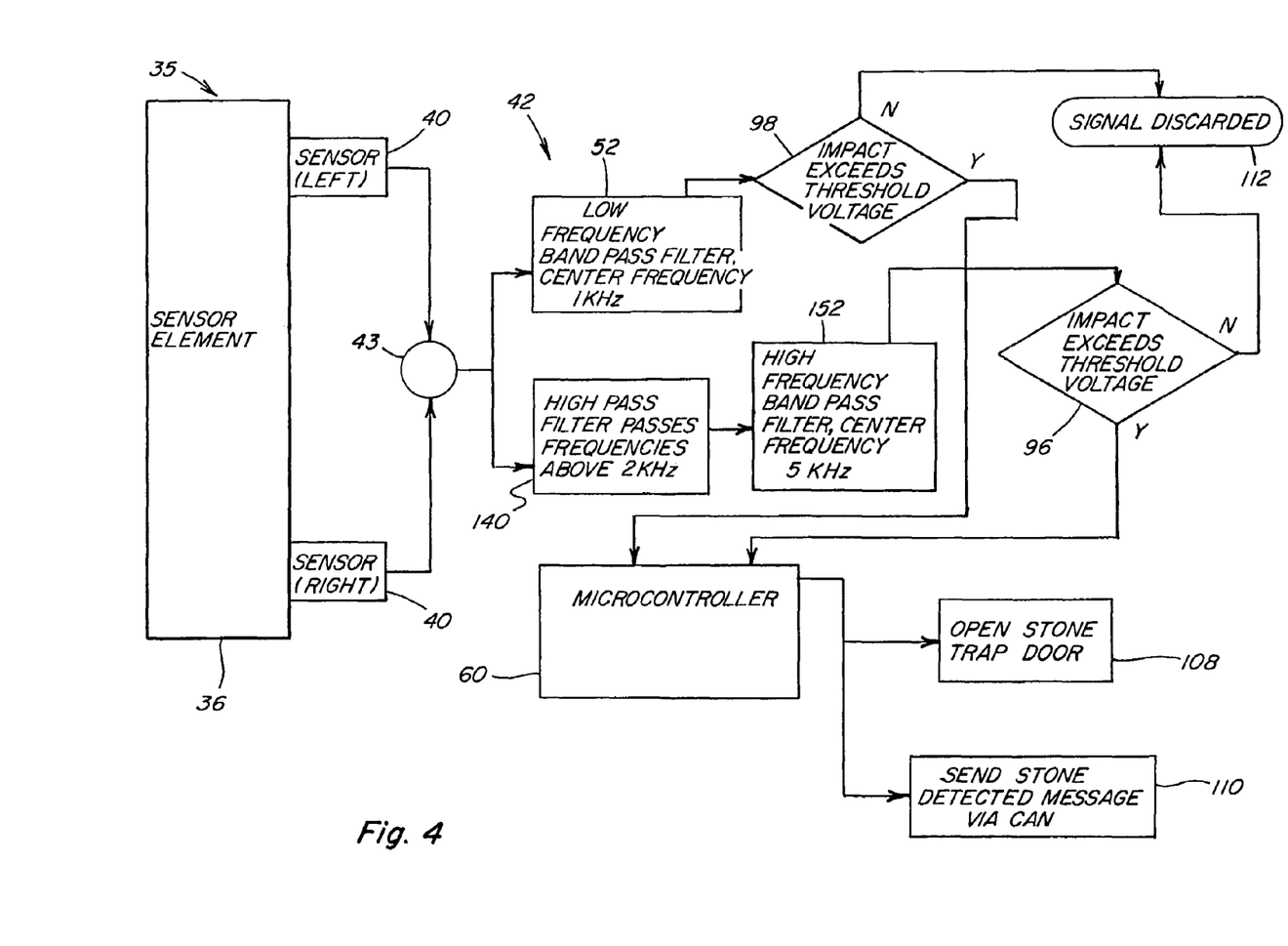
FIG. 4 is a block diagram of the invention also showing the parallel signal path.
Figure 5:
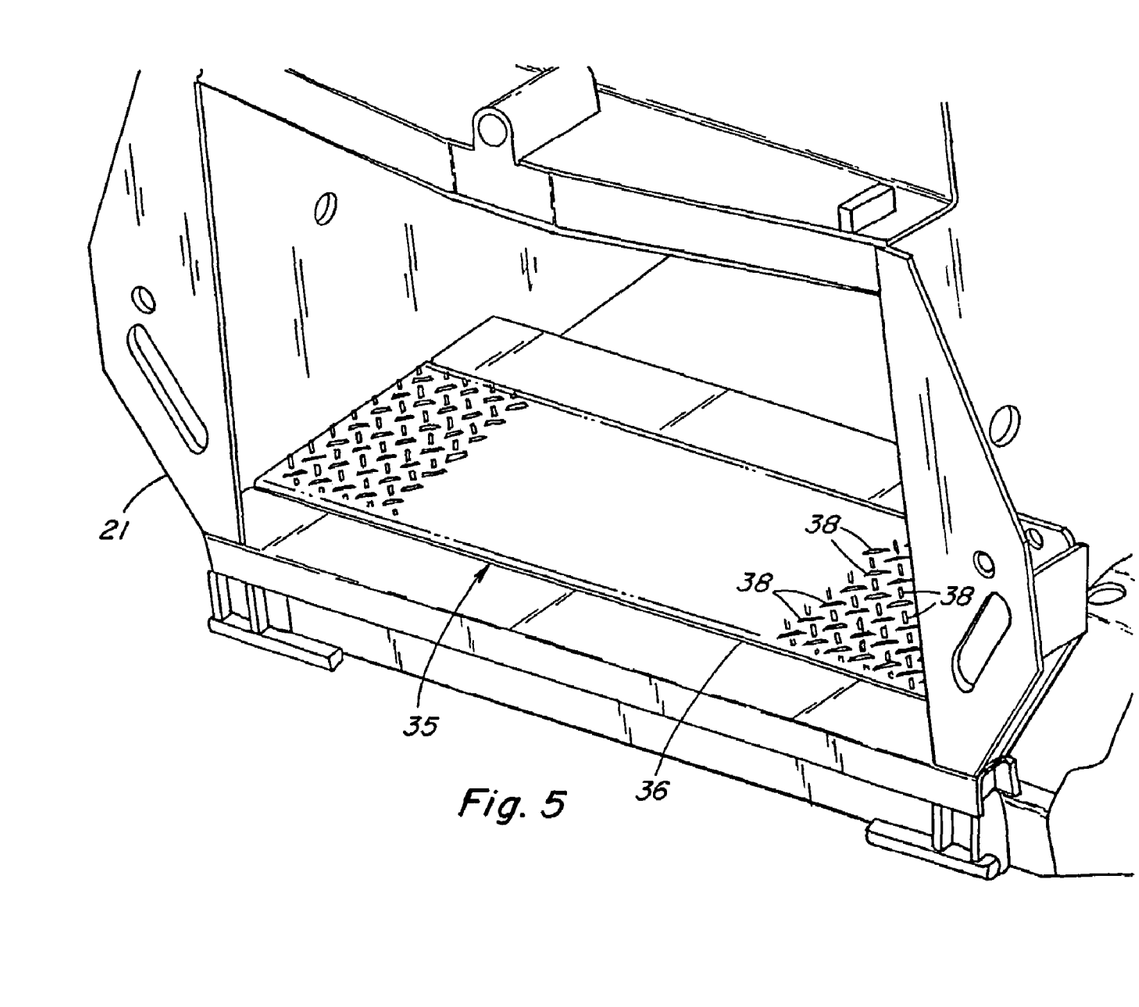
FIG. 5 is a fragmentary perspective view of an inlet end of an elevator of the harvester of FIG. 1, showing a preferred embodiment of a detector element according to the invention.

The hard object detector 35 serves to both detect and to remove any foreign hard objects from the flow of cut crop material passing through the elevator 21, thereby producing a flow of cut crop matter that is essentially free of foreign hard objects. As schematically shown in FIG. 4, and as illustrated in FIG. 5, the hard object detector 35 of elevator 21 includes a detector element 36 which is preferably a plate such as a sounding plate positioned in spaced relation beneath the front drum 22 (deleted in FIG. 5 for clarity but illustrated in FIG. 1), such that flows of cut crop material fed into elevator 21 will be forceably urged or driven over the upper surface of the sounding plate. The upper surface of the sounding plate is preferably at least generally parallel to the feederhouse floor and includes an array of "interruptions" 38 or "cleats" configured thereon, to ensure that a stone sliding thereover, or contained in a flow of crop material flowing thereover, impacts or contacts one or more of the interruptions 38 or otherwise "excites" or vibrates the plate to a sufficient magnitude so as to be detectable by an acoustic sensor, and such that the excitations or vibrations of the plate detected by the sensor will have at least one characteristic distinguishable from characteristics of excitations or vibrations of the plate caused by passage thereover of the crop material alone. It is contemplated that the interruptions could comprise many different embodiments.

For example, a preferred embodiment of the sounding plate shown in FIG. 5 includes interruptions 38 as commonly used and embodied by "diamond plate" technology. Such "diamond plate" technology is frequently used as a "no-slip surface" or in the construction of heavy-duty toolboxes, storage systems, etc. However, it should be appreciated that the sounding plate of the present invention is not limited to use of diamond plate technology; the minimum requirement of the sounding plate of the present invention is that its surface include any array or pattern of interruptions 38, such that the array or pattern of interruptions 38 would preclude a clear path of travel of an object from the front end to the rear of the sound plate in the direction of crop flow. Accordingly, the sound plate and surface interruptions 38 of detector element 36 of the present invention would dictate that an object (i.e. a stone) traveling from the front end to the rear of the sound plate would encounter at least one interruption 38 during its travel, thereby creating a sufficient "excitement" signature to qualify as a stone or other hard object event noise. It is thus contemplated that the sound plate interruptions 38 could include, but are not limited to, any array or pattern of obtrusions that would meet the aforementioned minimum requirement, such as a "dimple" configuration, array of random weld spatters, etc.

Figure 6:
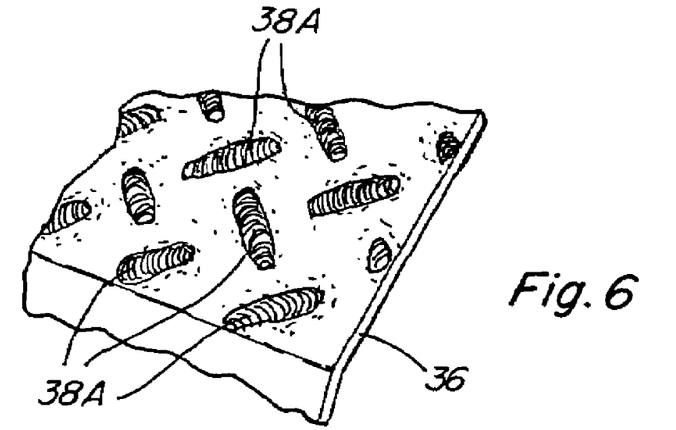
FIG. 6 is a fragmentary perspective view of another preferred embodiment of a detector element according to the invention.
Figure 7:
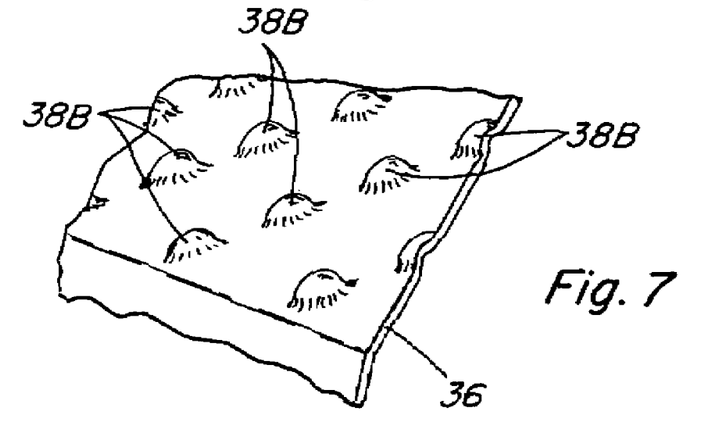
FIG. 7 is a fragmentary perspective view of another preferred embodiment of a detector element according to the invention.
Figure 8:
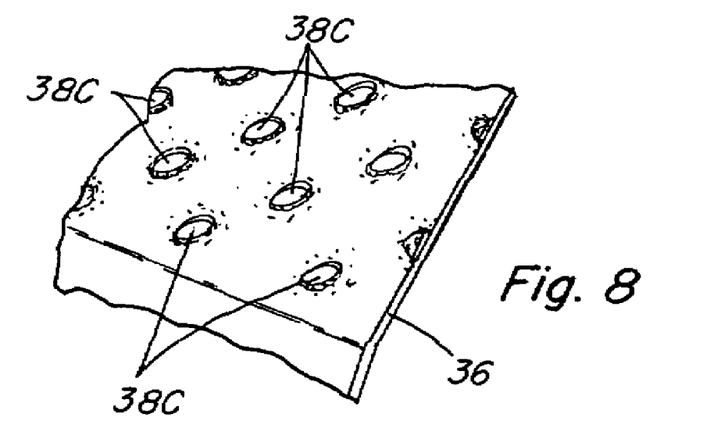
FIG. 8 is a fragmentary perspective view of still another preferred embodiment of a detector element according to the invention.

Referring also to FIGS. 6, 7 and 8, the sound plate of detector element 36 is shown including various alternative embodiments of interruptions which are considered suitable for causing the desired excitations of element 36 as crop material flow containing one or more hard objects pass thereover, including raised, elongate weld beads 38A in a diamond pattern (FIG. 6); an array of discrete raised obtrusions or bumps 38B (FIG. 7); and an array of generally round beads or dimples 38C (FIG. 8).

The excitations of detector element 36 signifying presence of a stone or other hard object in the crop flow thereover are sensed by at least one sensor 40 of an electrical detection circuit 42 operationally connected thereto and to a power supply 70, and a hard object removal mechanism 44 operationally connected to and controlled by detection circuit 42.

Preferably, each sensor 40 is an acoustic sensor, although the invention is not limited to acoustic sensors. Furthermore, the invention can be practiced using a sensor array, so that sensor 40 could actually be an array of two or several sensor devices, as illustrated by the two sensors in FIG. 4. Detection circuit 42 includes a high pass filter 140, programmable amplifiers 50 and 150, variable bandpass filters 52 and 152, variable threshold comparators 54 and 154, and microprocessor 60 that includes a pulse rejection network. Microprocessor 60 can be, for instance, the principal operating element of a microprocessor based microcontroller, as illustrated in FIG. 4. Power supply 70 is electrically connected to the detection circuit to provide power to run the system.

The details of detection circuit 42 are described below. Each sensor 40 is electrically connected to provide an object sensing input signal I1 to the programmable amplifier 50 and high pass filter 140 of circuit 42. Sensor 40 also provides an input signal I2 to microprocessor 60 in response to a feedback signal F1 from microprocessor 60. This feedback loop between sensor 40 and microprocessor 60 gives the microprocessor the ability to monitor the operation (i.e., activation status or sensitivity) of the sensor 40. In other words, signals I2 and F1 provide a self-diagnostic feedback loop between the sensor 40 and the microprocessor 60, thereby providing the microprocessor 60 with the capability to monitor the signal levels of sensor 40 and to determine fault conditions for the input transducer of sensor 40 and other input sub-systems in conjunction with the current state of the harvester 1 (i.e., whether the reel assembly running/reel assembly is or is not running).

It is known by anyone reasonably knowledgeable in the art that very large stones produce vibration signals from a sensor 40 that are significantly lower in frequency than those produced by medium and smaller stones. In order to prevent interference by the signal of the very large stones with the signal of smaller stones, the signals of sensors 40 are processed through detection circuit 42 via two circuit or signal paths. Amplifier 50, low frequency bandpass filter 52, and voltage comparator 54 form one signal path to amplify, select, and qualify signals from sensors 40 that only correspond to the very largest of stones that can enter the feederhouse. Frequency bandpass filter 52 is set to reject signals produced from sensors 40 caused by medium and smaller size stones.

In like manner, amplifier 150, high frequency bandpass filter 152, and voltage comparator 154 form another path to amplify, select and qualify signals from sensors 40 that only correspond to medium and small stones. Vibrations in the plate of detector element 36 corresponding to very large stones and other low frequency crop and machine noises are rejected by high filter 140 so that only signals from sensors 40 corresponding to medium and small stones are passed on to bandpass filter 152. A significant difference in this signal path is that high pass filter 140 is set to reject low frequency signals from the very large stones.

The signals from voltage comparators 54 and 154 are received by microprocessor 60. The magnitude of amplification performed by amplifiers 50 and 150 on signal I1 is controlled by microprocessor 60, which sends a control signal C1 and C2 to control the degree to which amplifiers 50 and 150 amplifies, either positively or negatively, the magnitude of signal I1. In this manner, the microprocessor can adapt the amplifiers 50 and 150 to various internal and/or external influences on signal strength over a broader range of amplitudes.

Bandpass filters 52 and 152 are electrically connected to amplifiers 50 and 150, respectively, and to comparators 54 and 154, respectively, and to microprocessor 60, and receive and filter signals I3 and I7, respectively, to produce frequency filtered signals I4 and I8, respectively, corresponding to a predetermined and preferred frequency bandwidth. In other words, high pass filter 140 and bandpass filter 152 generally filter out low frequency signals such as would be generated by soft organic crop material and very large stones passing through feederhouse 21 but transmit high frequency signals such as would be generated by medium and small hard objects or stones to be separated from the desired crop matter. Similarly, bandpass filter 52 accepts signals produced by the very largest stones and rejects signals produced by the smaller and medium size stones. In one preferred embodiment, bandwidth filters 52 and 152 are each a hardware-fixed bandwidth filter because such filters are relatively inexpensive.

In an alternative preferred embodiment, bandwidth filters 52 and 152 can be variable bandwidth filters that are electrically connected to receive input control signals directly from microprocessor 60. In this case, the frequency bandwidths filtered by bandwidth filters 52 and 152, respectively, are controlled by microprocessor 60, which sends the input control signals to set the bandwidths filtered by filters 52 and 152; therefore, filters 52 and 152 would be tunable by microprocessor 60 to adapt to varying internal and/or external influences on signal spectral content, theoretically improving the signal-to-noise ratio. In practice, however, it has been found that using an inexpensive fixed bandwidth filter provides a suitable degree of bandwidth filtering when used as bandwidth filters 52 and 152 and that utilizing the more expensive variable bandwidth filters do not significantly improve the operation of the hard object detector 35.

Variable threshold comparators 54 and 154 are electrically connected to filters 52 and 152, respectively, and to a pulse rejection network of microprocessor 60.

Comparator 54 receives signal I4 from filter 52 and generates signal I5 only when the magnitude of signal I4 exceeds a minimum threshold amplitude. Comparator 54 also receives a control signal C3 from microprocessor 60, which sets the voltage value of the minimum threshold amplitude. In this manner, microprocessor 60 provides comparator 54 with the ability to adapt to varying internal and/or external influences on signal strength.

In like manner, comparator 154 receives signal I8 from filter 152 and generates signal I9 only when the magnitude of signal I8 exceeds a minimum threshold amplitude. Comparator 154 also receives a control signal C4 from microprocessor 60, which sets the voltage value of the minimum threshold amplitude. In this manner, microprocessor 60 provides comparator 154 with the ability to adapt to various internal and/or external influences on signal strength.

Microprocessor 60 is electrically connected to comparators 54 and 154 and receives signal I5 and I9 from comparators 54 and 154 respectively. More specifically, microprocessor 60 includes a pulse rejection network that receives signals I5 and I9 and generates an internal signal when the pulse trains of signals I5 and I9 fall within a specified bandwidth frequency. Generally, the pulse rejection network includes a calculation circuit for calculating the frequency of the pulse train of signals I5 and I9, then this calculated frequency is inputted into a fixed bandpass filter that is also a part of the pulse rejection network of microprocessor 60. In this manner, the pulse rejection network excludes "glitches," that is, spurious signals failing to meet a specified pulse train frequency requirement, thereby minimizing false detections.

When the pulse rejection network generates the internal signal, microprocessor 60 subsequently utilizes the internal signal to generate activating signal A1 that is transmitted from the microprocessor to activate a solenoid 44s of hard object removal mechanism 44 that is electrically connected to microprocessor 60. As will be appreciated by one skilled in the art, the internal signal ultimately generated by the pulse rejection network is the product of amplifying, frequency bandwidth filtering, threshold amplitude comparing, and pulse train frequency exclusion of initial signal I1. As will also be appreciated by one skilled in the art, microprocessor 60 can be preprogrammed to generate control signals C1, C2, C3 and C4, and feedback signal F1, or the microprocessor can be operationally connected to receive signals from a control panel 80 preferably located in cab 2 for operator 11 to manipulate so that the operator has the ability to adjust the operation of sensor 40 and circuit 42.

Preferably, hard object removal mechanism 44 is broadly conceived to include any electromechanical mechanism for removing the hard objects from the flow of crop material and is not limited to any one particular mechanism. One example of a suitable hard object removal system for removing the hard objects from the crop material flow is disclosed in U.S. Pat. No. 6,298,641 B1 to Digman et al., which is incorporated herein by reference in its entirety. In this specific embodiment of the present invention, the hard object removal mechanism 44 includes an aperture in the floor of the housing of elevator 21.

The flow of cut crop material passes over this aperture and remains in the elevator 21 because a trap door covers the aperture, thereby substantially blocking the aperture and preventing the flow of cut crop material from passing out of the elevator through the aperture and onto the ground. A solenoid 44s operated by the microprocessor 60 is activated whenever a foreign object is detected in the flow of cut crop material by the detection circuit 42, which generates a solenoid activating output signal A1. The solenoid is operationally connected to activate a door opening mechanism that subsequently opens the trap door in response to the solenoid activating output signal.

Once the trap door is open, the aperture is no longer covered and gravity causes the crop material flow to exit the elevator 21 through the aperture. In addition, a sled can be used to help divert the crop flow towards the aperture. In this manner, those portions of the cut crop material flow containing the undesirable hard object or objects are selectively discharged (removed) to the ground. The trap door remains open only for a brief predetermined time period before the solenoid 44s is deactivated by the microprocessor 60 and a door closing mechanism, such as a door closing cable and latch, automatically closes the trap door. It is stressed, however, that the present invention can be practiced using other electromechanical mechanisms for removing hard objects from the flow of crop material.

Figure 2:
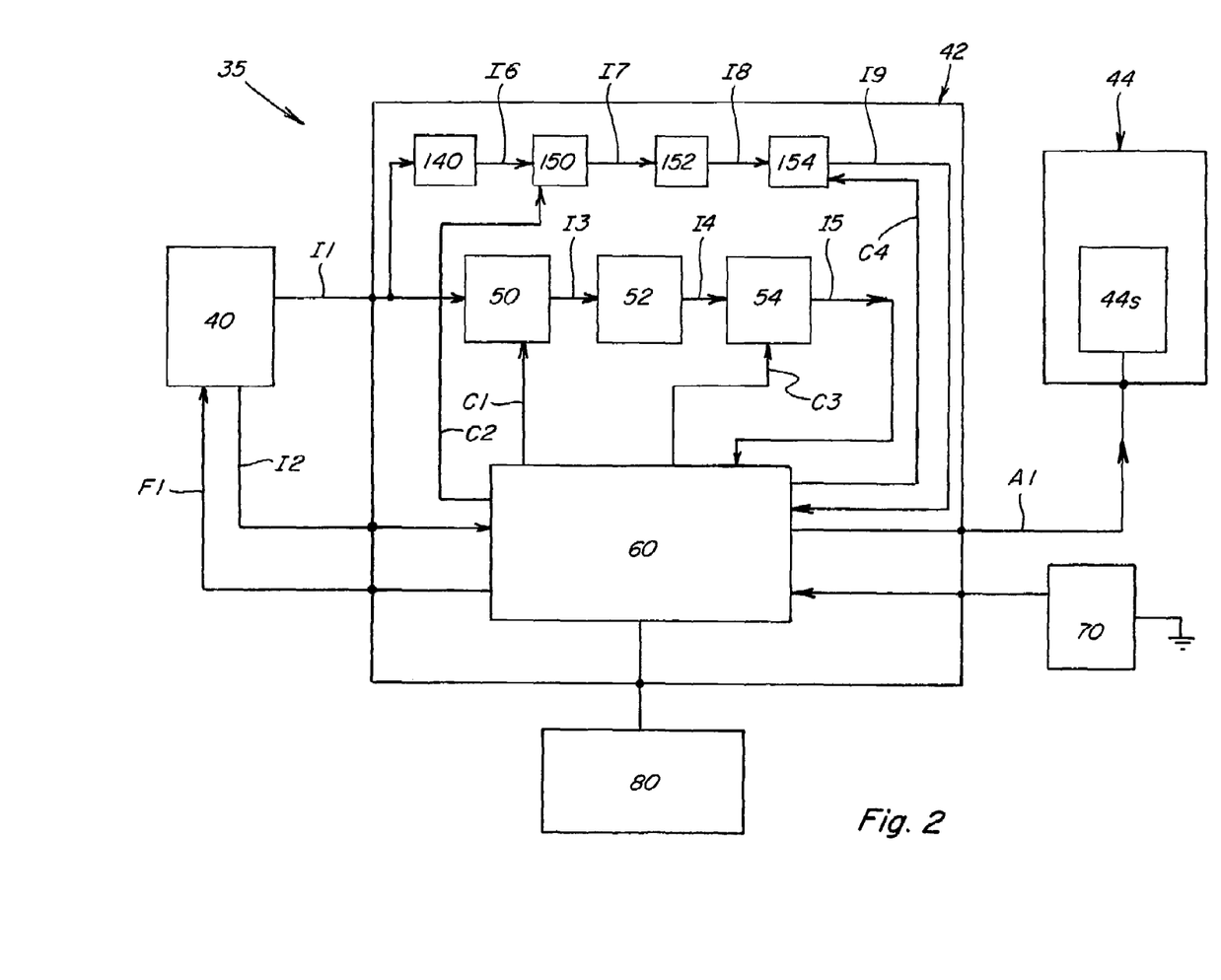
FIG. 2 is a schematic drawing of apparatus in accordance with a preferred embodiment of the present invention.
Figure 3:
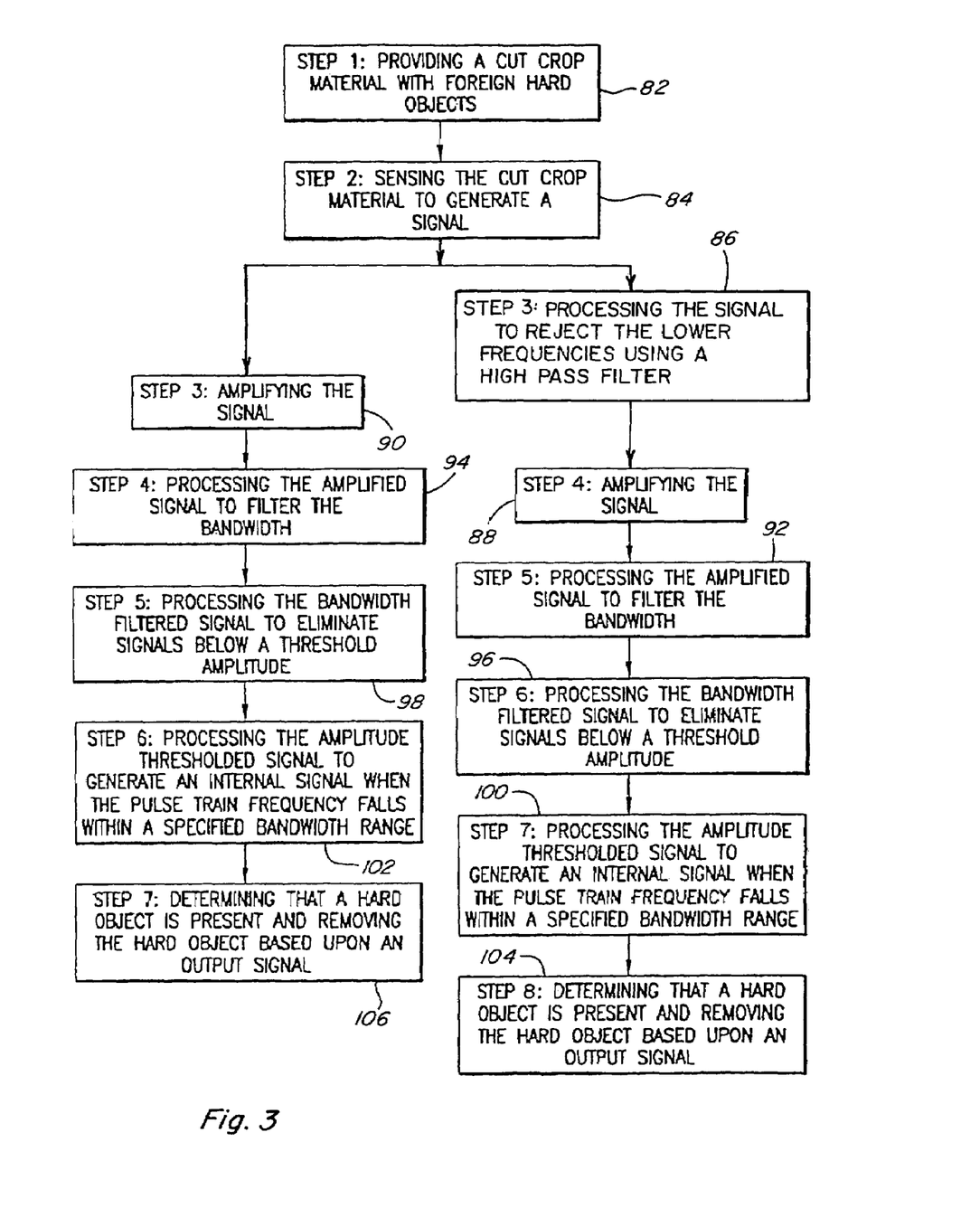
FIG. 3 is a flow diagram according to a preferred embodiment of the invention showing parallel signal paths directed to the method for detecting and removing hard objects from a cut crop material.

Having fully described the apparatus in accordance with the present invention, the method for detecting and removing hard objects, such as stones and the like, from a cut crop material in accordance with the present invention will be described. FIGS. 2 through 4 outline important aspects of the method of the present invention. First, a cut crop material that includes foreign hard objects in addition to cut crop matter is provided when the header 12 is activated to cut crops, as denoted by block 82 in FIG. 3. Second, sensors 40 sense the excitations generated by the passage of the cut crop material and the foreign hard objects over the plate of detector element 36 and generate signals representative thereof, as denoted at block 84 in FIG. 3. As mentioned above and as illustrated in FIG. 4, more than one sensor 40 can be used, and the signals outputted therefrom can be summed, as indicated at summing point 43 in FIG. 4. Third, the signal is outputted along the two signal paths, including a first signal path so as to be processed to reject frequencies below a first frequency using a high pass filter 140 (FIGS. 2 and 4), as denoted at block 86 in FIG. 3, then to be amplified by amplifier 150 (FIGS. 2 and 4), as denoted at block 88 in FIG. 3, and a second signal path so as to be amplified by amplifier 50 (FIGS. 2 and 4), as denoted at block 90 in FIG. 3, wherein the magnitudes of amplification are controlled by microprocessor 60. A suitable value for the first frequency can be, for instance, about 2 kHz.

Next, the amplified signals are processed by bandwidth filters 52 and 152 (FIGS. 2 and 4), as denoted at blocks 92 and 94 in FIG. 3, to filter the bandwidths of the amplified signals to generate first and second bandwidth filtered signals, respectively, wherein optionally microprocessor 60 controls the frequency ranges of the filtered bandwidths. A suitable center frequency for the first bandwidth filtered signal can be, for instance, a frequency of about 5 kHz, and a suitable center frequency for the second bandwidth filtered signal can be about 1 kHz, as illustrated in FIG. 4. The bandwidth filtered signals are now processed by variable voltage threshold comparators 54 and 154 (FIG. 2), as denoted at blocks 96 and 98 in FIGS. 3 and 4, to generate amplitude thresholded signals when the respective bandwidth filtered signals exceed a minimum threshold amplitude, wherein microprocessor 60 controls the value of the minimum threshold voltage amplitude. Signals below the threshold minimum amplitudes are discarded, as denoted at block 112 in FIG. 4.

Now, the amplitude thresholded signals are each processed by a pulse rejection network of the microprocessor 60 to generate an internal signal only when the amplitude thresholded signal has a pulse train frequency that falls within a specified bandwidth frequency value, thereby eliminating noise signals, as denoted at blocks 100 and 102 in FIG. 3. The last step is determining that a hard object is present based upon the internal signal, which is generally performed by microprocessor 60, then removing the hard object using a hard object removal mechanism 44 to produce a cut crop material that is essentially cut crop matter only and contains no hard foreign objects, as denoted at blocks 104 and 106 in FIG. 3. In this step, microprocessor 60 determines that a hard object is present based upon the internal signal from the pulse rejection network and transmits an activation signal to a solenoid 44s of removal mechanism 44 (FIG. 2), thereby setting the removal mechanism 44 into action to remove the hard object. This is effected by opening the stone trap door, as denoted at block 108 in FIG. 4. Additionally, a stone detected message can be sent via the CAN (controller area network) or other suitable conductive path, to alert operator 11, as denoted at block 110 in FIG. 4.

As will be appreciated by one skilled in the art, the sequence of steps in the method for detecting and removing hard objects from a cut crop in accordance with the present invention is not limited to the particular listed step sequence. Plainly, the first and last steps must remain as the first and last steps of the method; however, some steps such as the bandwidth filtering step and the amplitude thresholding step can be interchanged without departing from the scope and spirit of the method.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. Apparatus for detecting hard objects in a flow of cut crop material softer than the hard objects flowing along a flow path between harvesting apparatus of an agricultural harvesting machine and threshing apparatus thereof, comprising:

a detector element disposed along the flow path and configured such that flows of crop material along the flow path will contact the detector element to generate vibrations thereof, and such that at least some of any hard objects in the flows of crop material that contact the detector element will generate vibrations thereof at least generally within a first frequency band and a second frequency band having amplitudes greater than amplitudes of vibrations generated by the crop material alone;

at least one vibration sensor operable for sensing vibrations of the detector element and responsively outputting signals representative thereof over a first signal path and a second signal path;

the first signal path including a high pass filter operable for filtering the signal outputted over the first signal path to suppress frequencies thereof below a first frequency within or below a lower portion of the first frequency band to create a first frequency filtered signal, a high frequency bandpass filter operable for filtering the first frequency filtered signal so as to pass frequencies thereof generally within the first frequency band as a first bandwidth filtered signal, and a device operable for selectively outputting the first bandwidth filtered signal when the first bandwidth filtered signal is representative of vibrations having the amplitudes greater than the amplitudes of vibrations generated by the crop material alone; and the second signal path including a low frequency bandpass filter operable for filtering the signal outputted thereover so as to pass frequencies thereof within the second frequency band, and a device operable for selectively outputting the second bandwidth filtered signal when representative of vibrations having the amplitudes greater than the amplitudes of vibrations generated by the crop material alone.

2. The apparatus of claim 1, further comprising a controller for receiving the first and second bandwidth filtered signals and responsively operating a hard object removal mechanism disposed along the flow path at a location downstream of the detector element in a direction of the flow of the crop material.

3. The apparatus of claim 2, wherein the first and second bandwidth filtered signals will have voltage amplitudes corresponding with the amplitudes of vibrations of the detector element, and the controller is programmed to operate the hard object removal mechanism when at least one of the first and second bandwidth filtered signals received by the controller has a voltage amplitude equal to or above a threshold voltage amplitude.

4. The apparatus of claim 3, wherein the controller is operable for varying a value of the threshold voltage amplitude.

5. The apparatus of claim 3, wherein the controller is operable for varying a frequency range of at least one of the first and second bandwidth filtered signals.

6. The apparatus of claim 1, wherein the first bandwidth filtered signal is centered about a center frequency of about 5 kHz.

7. The apparatus of claim 1, wherein the second bandwidth filtered signal is centered about a center frequency of about 1 kHz.

8. The apparatus of claim 1, wherein the detector element comprises a plate configured such that hard objects of a first size range in the flows of crop material contacting the plate will generate vibrations thereof having frequencies within about the first frequency band, and hard objects of a second size range larger than the first size range in the flows of crop material contacting the plate will generate vibrations thereof having frequencies within about the second frequency band.

9. The apparatus of claim 1 wherein the at least one vibration sensor disposed for sensing vibrations of the detector element and outputting signals representative thereof over a first signal path and a second signal path comprises two vibration sensors.

10. The apparatus of claim 1, wherein the detector element has a surface disposed such that the flows of crop material will flow thereover, the surface including at least one interruption extending outwardly therefrom so as to be positioned to be impacted by at least some of any hard objects in the flows of crop material that flow over the surface.

11. A method for detecting hard objects in a flow of cut crop material softer than the hard objects flowing along a flow path between harvesting apparatus of an agricultural harvester and threshing apparatus thereof, comprising steps of:

providing a detector element along the flow path so as to be vibrated by the flow of crop material therealong, and such that at least some of any hard objects in the flows of crop material generate vibrations of the detector element at least generally within a first frequency band and a second frequency band, and wherein at least some of the vibrations within the first and second frequency bands generated by the hard objects have amplitudes greater than amplitudes of vibrations generated by the crop material alone;

sensing the vibrations of the detector plate and responsively outputting signals representative thereof over a first signal path and a second signal path, respectively;

filtering the signal outputted over the first signal path to suppress frequencies thereof below a first frequency within or below a lower portion of the first frequency band to create a first frequency filtered signal, filtering the first frequency filtered signal so as to pass frequencies thereof generally within the first frequency band as a first bandwidth filtered signal, and selectively outputting the first bandwidth filtered signal when the first bandwidth filtered signal is representative of vibrations having the amplitudes greater than the amplitudes of vibrations generated by the crop material alone; and filtering the signal outputted over the second signal path so as to pass frequencies thereof within the second frequency band, and selectively outputting the second bandwidth filtered signal when representative of vibrations having the amplitudes greater than the amplitudes of vibrations generated by the crop material alone.

12. The method of claim 11, further comprising a step of providing a controller which receives the first and second bandwidth filtered signals and responsively operates a hard object removal mechanism disposed along the flow path at a location downstream of the detector element in a direction of the flow of the crop material.

13. The method of claim 12, wherein the first and second bandwidth filtered signals will have voltage amplitudes corresponding with the amplitudes of vibrations of the detector element, and the controller operates the hard object removal mechanism when at least one of the first and second bandwidth filtered signals received by the controller has a voltage amplitude equal to or above a threshold voltage amplitude.

14. The method of claim 13, wherein the controller is operable for varying a value of the threshold voltage amplitude.

15. The method of claim 13, wherein the controller is operable for varying a frequency range of at least one of the first and second bandwidth filtered signals.

16. The method of claim 11, wherein the first bandwidth filtered signal is centered about a center frequency of about 5 kHz.

17. The method of claim 11, wherein the second bandwidth filtered signal is centered about a center frequency of about 1 kHz.

18. The method of claim 11, wherein the detector element comprises a plate configured such that hard objects of a first size range in the flows of crop material contacting the plate generate vibrations thereof having frequencies within about the first frequency band, and hard objects of a second size range larger than the first size range in the flows of crop material contacting the plate generate vibrations thereof having frequencies within about the second frequency band.

19. The method of claim 11, wherein the detector element has a surface disposed such that the flows of crop material flow over the surface, the surface including at least one interruption extending outwardly therefrom so as to be impacted by at least some of any hard objects in the flows of crop material that flow over the surface.

20. The method of claim 11, wherein the first frequency has a value of about 2 kHz.

21. The method of claim 11, comprising a step of amplifying the first frequency filtered signal, and amplifying the signal outputted over the second signal path.

22. A hard foreign object detecting circuit for detecting hard foreign objects in a flow of cut crop material toward a threshing system of an agricultural harvester, comprising:

at least one vibration sensor operable for generating a first input signal in response to vibrations generated by a hard foreign object;

a frequency high pass filter that receives the first input signal and removes frequencies below a first frequency therefrom to produce a first high pass filtered input signal;

a first programmable amplifier that receives the first high pass filtered input signal and generates an amplified first output signal;

a frequency bandpass filter that receives and filters a bandwidth of the amplified first output signal to generate a first frequency filtered signal;

a first variable threshold comparator that receives the first frequency filtered signal and generates a first pulse output signal when the first frequency filtered signal exceeds a minimum threshold amplitude;

a microprocessor including a first pulse rejection network that receives the first pulse output signal and generates an internal signal when a frequency calculated from a pulse train of the first pulse output signal corresponds to a predetermined frequency bandwidth, the microprocessor being electronically connected to the first variable threshold comparator and to the first programmable amplifier, and the microprocessor being operable to control the value of the minimum threshold amplitude of the first threshold comparator and to control a magnitude of signal amplification performed by the first programmable amplifier, and the microprocessor being operable to activate a hard object removal mechanism responsive to the generation of the internal signal;

a second programmable amplifier which receives the first input signal and produces a second amplified input signal;

a low frequency band pass filter which receives the second amplified input signal and produces a second frequency filtered signal;

a second variable threshold comparator that receives the second frequency filtered signal and generates a second pulse output signal when the second frequency filtered signal exceeds a minimum threshold amplitude;

a microprocessor including a second pulse rejection network that receives the second pulse output signal and generates an internal signal when a frequency calculated from a pulse train of the second pulse output signal corresponds to a specified frequency bandwidth, the microprocessor including the second pulse rejection network being electronically connected to the second threshold comparator and to the second programmable amplifier, the microprocessor including the second pulse rejection network being operable to control the value of the minimum threshold amplitude of the second threshold comparator and to control a magnitude of signal amplification performed by the second programmable amplifier, and the microprocessor including the second pulse rejection network being operable to activate the hard object removal mechanism responsive to the internal signal generated when the frequency calculated from the pulse train of the second pulse output signal corresponds to the specified frequency bandwidth.

23. The circuit of claim 22, wherein the microprocessor including the first pulse rejection network and the microprocessor including the second pulse rejection network comprise a single microprocessor.

24. The circuit of claim 22, wherein the first frequency has a value of about 2 kHz.

25. The circuit of claim 22, wherein the first frequency filtered signal is centered about a center frequency of about 5 kHz.

26. The circuit of claim 22, wherein the second frequency filtered signal is centered about a center frequency of about 1 kHz.

* * * * *